Dec. 17, 1935.  M. ROMAINE ET AL  2,024,254
BROACHING MACHINE
Filed Sept. 18, 1934  8 Sheets-Sheet 2
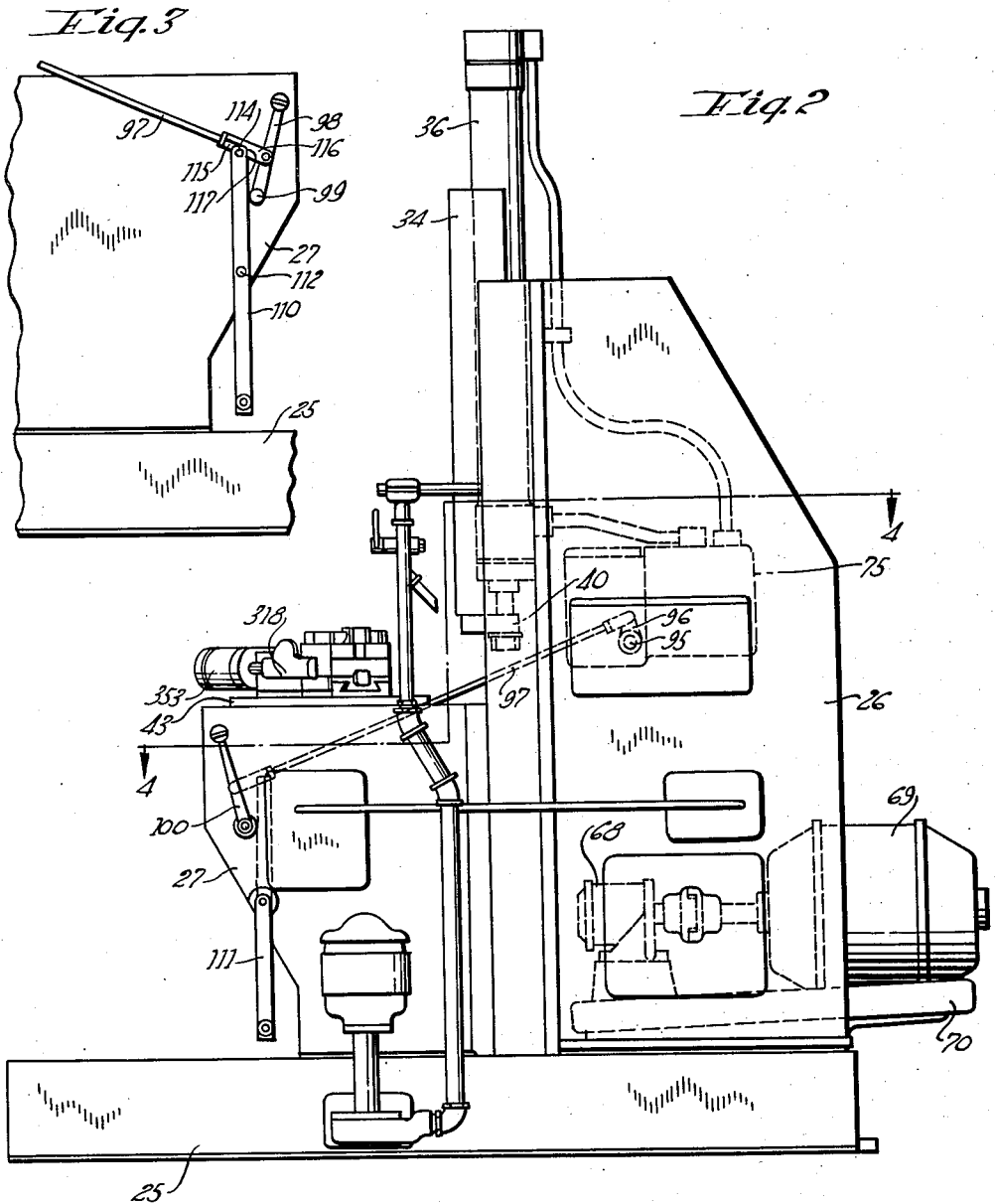
Inventors
MILLARD ROMAINE
ERWIN G. ROEHM
By H. K. Parsons
Attorney Dec. 17, 1935. M. ROMAINE ET AL 2,024,254
BROACHING MACHINE
Filed Sept. 18, 1934 8 Sheets-Sheet 3

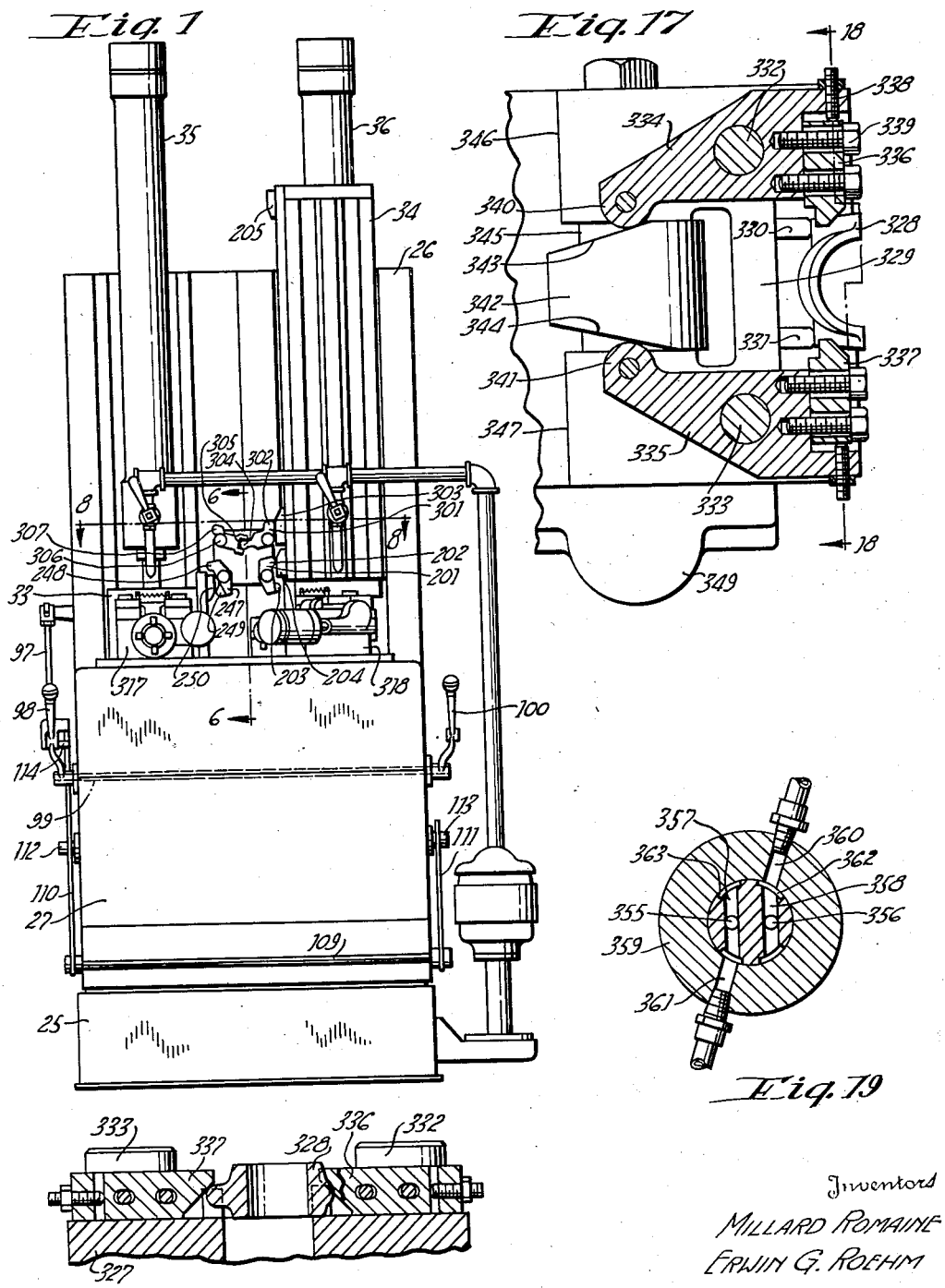

Inventors
MILLARD ROMAINE
ERWIN G. ROEHM
By H. K. Parsons
Attorney

Dec. 17, 1935.  M. ROMAINE ET AL  2,024,254
BROACHING MACHINE
Filed Sept. 18, 1934   8 Sheets-Sheet 4

Inventors
MILLARD ROMAINE
ERWIN G. ROEHM
By A.H.K. Parsons
Attorney

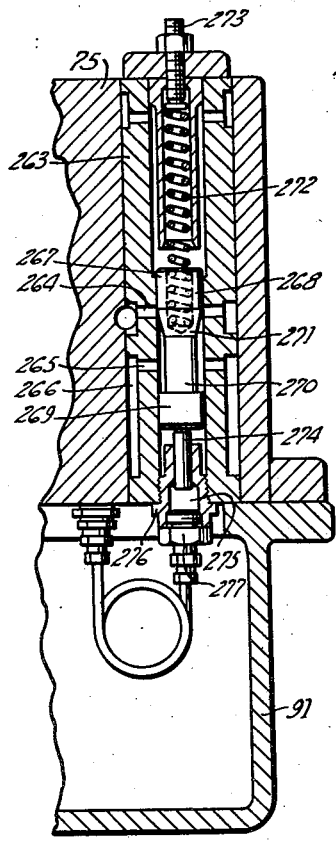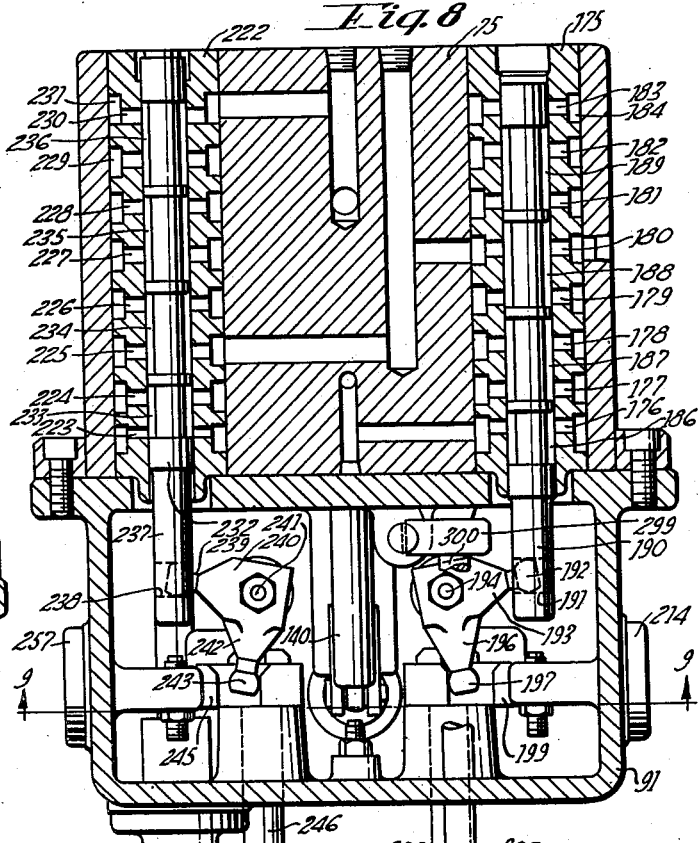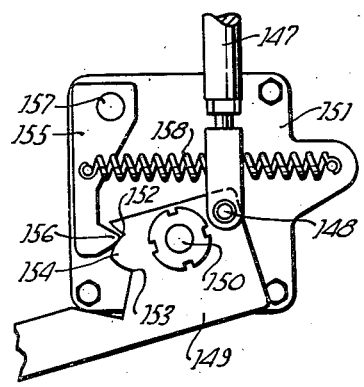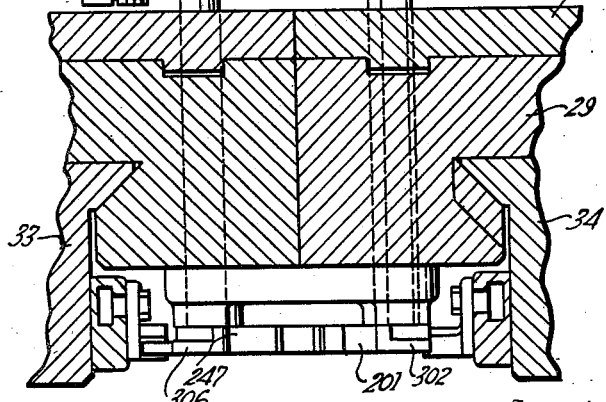

Dec. 17, 1935.   M. ROMAINE ET AL   2,024,254
BROACHING MACHINE
Filed Sept. 18, 1934   8 Sheets-Sheet 6
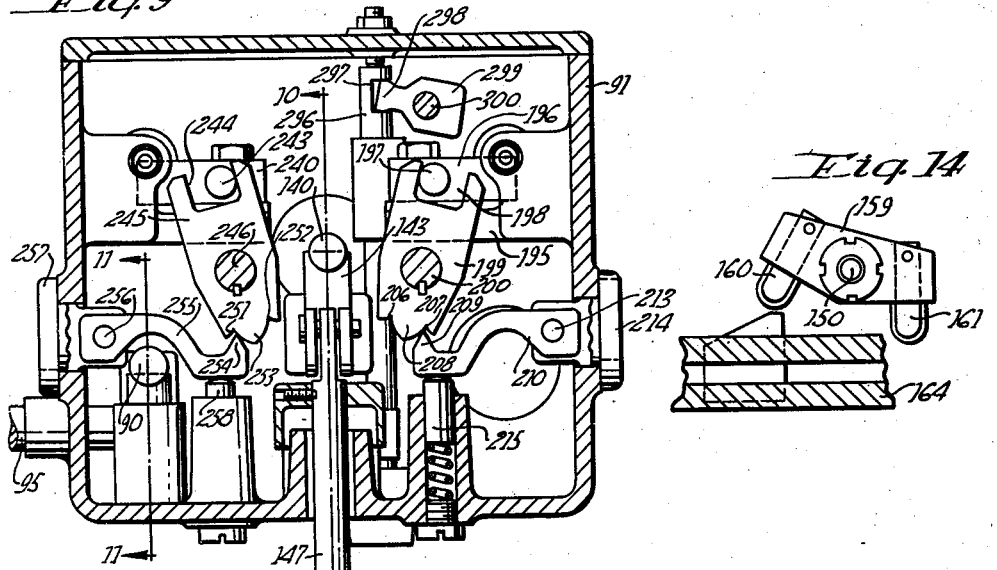
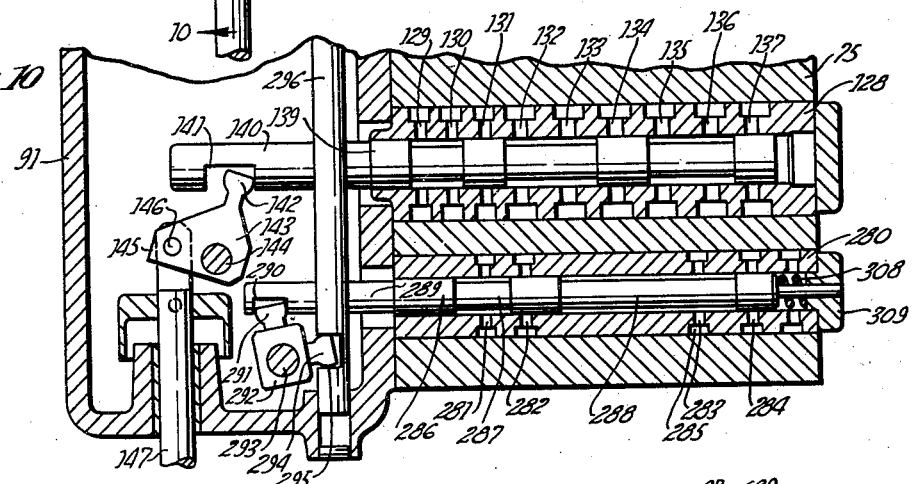
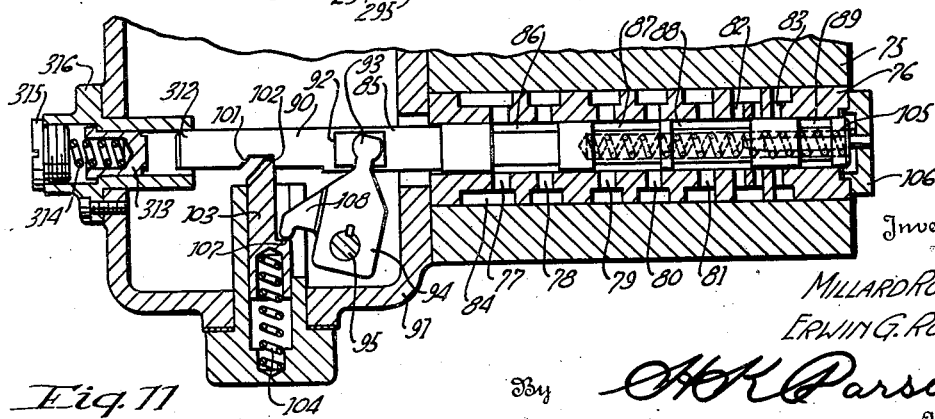
Inventors
MILLARD ROMAINE
ERWIN G. ROEHM
By A. K. Parsons
Attorney Dec. 17, 1935.  M. ROMAINE ET AL  2,024,254
BROACHING MACHINE
Filed Sept. 18, 1934   8 Sheets-Sheet 7

Inventors
MILLARD ROMAINE
ERWIN G. ROEHM
By AHK Parsons
Attorney

Dec. 17, 1935.   M. ROMAINE ET AL   2,024,254
BROACHING MACHINE
Filed Sept. 18, 1934   8 Sheets-Sheet 8

Inventors
MILLARD ROMAINE
ERWIN G. ROEHM
By H. K. Parsons
Attorney

Patented Dec. 17, 1935

2,024,254

UNITED STATES PATENT OFFICE 2,024,254

BROACHING MACHINE

Millard Romaine, Cincinnati, and Erwin G. Roehm, Norwood, Ohio, assignors to The Cincinnati Milling Machine Co., Cincinnati, Ohio, a corporation of Ohio Application September 18, 1934, Serial No. 744,552

16 Claims. (Cl. 90—33)

This invention relates to improvements in machine tools and particularly to improvements in hydraulically actuated broaching machines.

One of the principal objects of the present invention is to provide a duplex type of broach actuated and controlled by hydraulic mechanisms in which the parts are more accurately controlled and in which the actuating and control mechanisms have been reduced to their simplest form.

Another object of this invention is the provision of a hydraulically actuated machine tool mechanism adapted normally to have a continuous cycle, but which cycle in an emergency may be interrupted and certain parts reversed without having first completed their movements in the cyclic direction.

A further object of the invention is the provision of a duplex broach in which the two rams and the parts controlled thereby are so related to one another that the rams are kept in step without the use of auxiliary compensating or make-up means.

A still further object of the invention is the provision of a broaching machine having an indexible table to which a plurality of work pieces are secured for alternate presentation to a broaching tool and in which automatic means are employed for effecting the clamping of the work.

A further object of the invention is the provision of power actuated means for simultaneously clamping and unclamping work pieces to an indexible work supporting table during its operation, between the several operative positions thereof, thereby reducing idle time to a minimum and relieving the operator of the fatigue incidental to manual clamping and unclamping of the work in a continuously operating automatic machine.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 1 is a front elevation of the broaching machine embodying the improvements of this invention.

Figure 2 is a side elevation of the machine shown in Figure 1 as seen particularly from the right hand side thereof.

Figure 3 is a fragmentary elevational view of the knee of the machine shown in Figures 1 and 2 as seen particularly from the left hand side of Figure 1.

Figure 8 is a horizontal sectional view through the valve housing and valve actuating mechanism as seen from lines 8—8 on Figure 1.

Figure 9 is a sectional view taken substantially on line 9—9 on Figure 8 and illustrating the valve shifting mechanism.

Figure 10 is a sectional view taken substantially on line 10—10 on Figure 9 and illustrating the valve actuated by the indexing table.

Figure 11 is a sectional view through the starting, stopping and emergency reverse valve as seen from line 11—11 on Figure 9.

Figure 12 is a sectional view through a relief or pressure reducing valve as seen substantially from line 12—12 on Figure 9.

Figure 13 is a fragmentary elevational view of the load and fire and detent mechanism utilized in connection with the table control valve and seen substantially from line 13—13 on Figure 6.

Figure 14 is a fragmentary view of the dog mechanism utilized in connection with the table controlled valve as seen from line 14—14 on Figure 7.

Figure 17 is a horizontal sectional view through the fixture as seen from line 17—17 on Figure 16.

Figure 18 is a view taken at substantially a right angle to Figure 17 as seen from line 18—18 on Figure 17.

Figure 19 is a view through the tables trunnion and illustrating the porting therethrough whereby said trunnion is utilized as a valve for the clamping and unclamping of the work; the view being taken on line 19—19 on Figure 6.

Throughout the several views of the drawings similar reference characters are employed to denote the same or similar parts.

As is noted above, this invention pertains to hydraulically operated machine tools and particularly broaching machines. The machine of the present invention is so designed as to reduce the number of parts and particularly fluid pipes or conduits to an absolute minimum as the various valves are all enclosed within a single valve block which is interdrilled and ported to connect the various valves which are movable to vary the circuits through the valve. Furthermore, this invention is directed to a machine in which the movable rams are kept in step with one another, or if they get out of phase are readily brought back into phase without the use of auxiliary compensating valves or mechanism as was considered necessary in prior art machines. Additionally, this invention contemplates the automatic clamping and releasing of work pieces on a movable work support or table which is effected during the actual operation of the machine, thereby requiring an operator merely to replace a finished work piece with an unfinished one while the machine continues to function. Included in the machine, however, is means for readily stopping the operation thereof, should, for any reason, the operator not get the work pieces changed prior to the operation of the work support or table or should the clamping mechanism for some reason fail to properly operate. Additionally, should an emergency arise such as a wreck or a jambing of the parts the movement of the rams may be reversed before the said rams complete their cyclic movement in a given direction. From the foregoing general remarks it will be appreciated that there has been provided a multiple hydraulically operated machine that is simple in construction, safe for the operator and machine, and yet may be readily stopped or reversed in case of malfunctioning of the machine or if an emergency arises.

Figure 4:
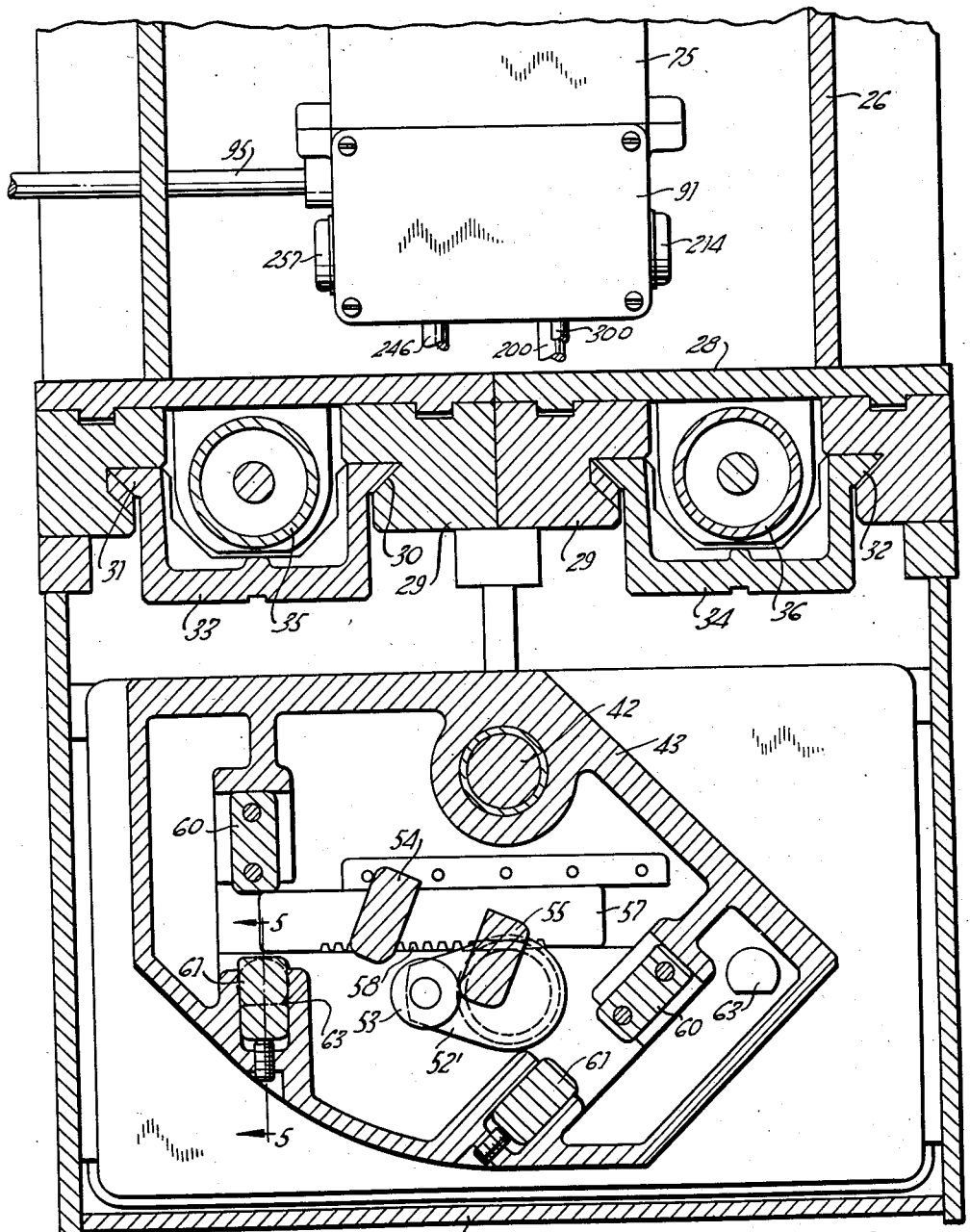
Figure 4 is a fragmentary horizontal sectional view through the machine as seen, for example, on line 4—4 on Figure 2.

Specifically, the machine of this invention comprises a base 25 which is of hollow construction and utilized as a tank for fluid, preferably oil, as will later appear. Rising from the base 25 is a column 26 to the forward face of which is secured the knee or table support 27. As will be readily appreciated from Figure 4, the base, column and knee are of fabricated construction, that is, built up from suitable sheets of steel welded to one another. Since this welded construction forms no particular part of the present invention the details thereof will not be described in detail, reference being had to the drawings for such information.

The column 26 is provided with a front plate 28 to which is bolted or otherwise secured a plurality of bars 29, each having formed therein a substantially V-shaped groove 30. Opposed grooves 30 in opposite bars form in effect a dovetail guide way receiving a correspondingly shaped guides 31 and 32 respectively integral with slides or rams 33 and 34. The rams 33 and 34 are substantially U-shaped in cross section, thereby providing a hollow space behind each ram, which together with additional space provided by the bars 29 is utilized for the means which actuates the rams; the means for actuating the rams 33 and 34, as shown in the drawings, comprises a pair of cylinders 35 and 36 each of which respectively encloses a piston 37 and 38, see Figure 20. The piston 37 is connected by a strap or bracket 39 with the ram 33 while the piston 38 is connected by a similar bracket or strap 40 with the ram 34. The means for actuating the pistons 37 and 38 is clearly shown in Figure 20 and will be described in detail later.

Figure 6:
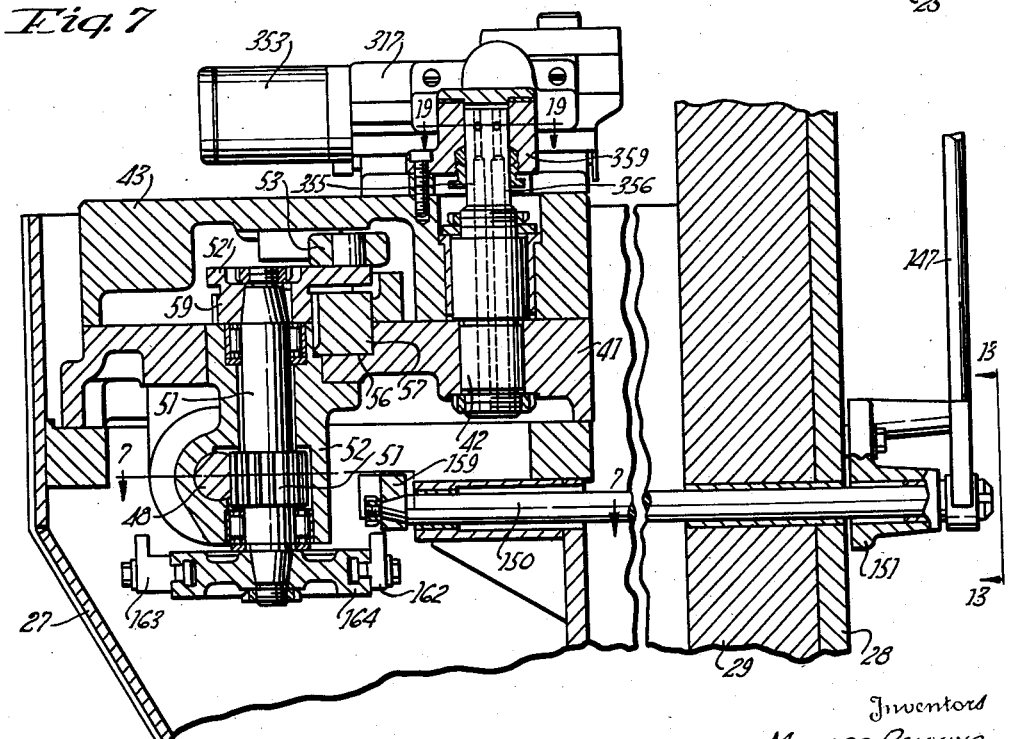
Figure 6 is a fragmentary vertical sectional view as seen from lines 6—6 on Figure 1.
Figure 15:
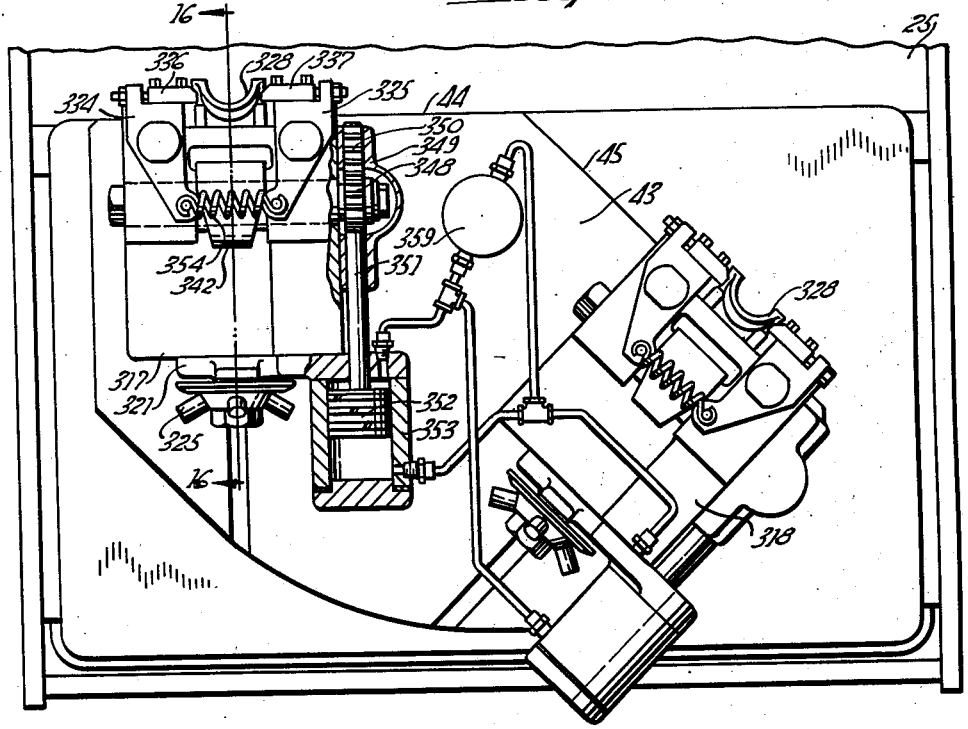
Figure 15 is an enlarged plan view of the work supporting table and the work fixtures thereon.
Figure 16:
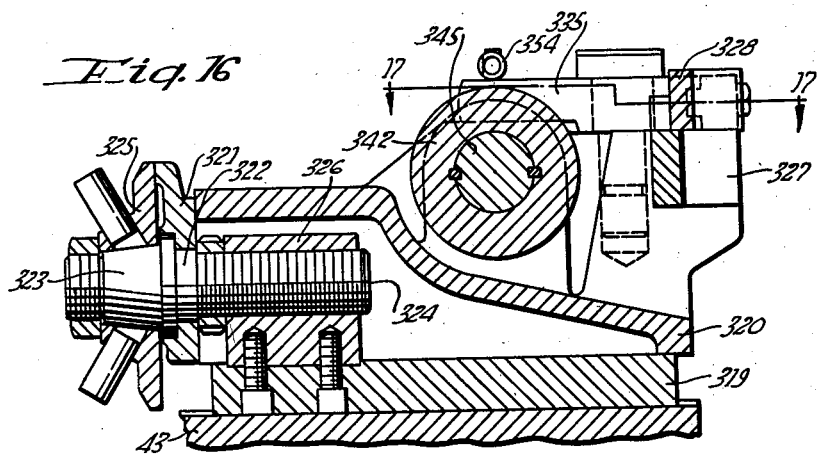
Figure 16 is a longitudinal sectional view through one of the work fixtures as seen from line 16—16 on Figure 15.

The table support or knee 27 has an upper plate 41 which supports the work table and the means for actuating it. As shown in Figure 6 the plate 41 has rising therefrom a stud or shaft 42 which constitutes a trunnion for the table 43. As seen in Figure 15, the table 43 is provided on its inner end with a pair of angularly disposed faces 44 and 45 which are adapted to be alternately aligned respectively with the rams 33 and 34 so that the work pieces thereon may be tooled or broached.

Figure 5:
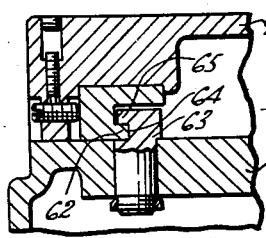
Figure 5 is a fragmentary sectional view taken on line 5—5 of Figure 4, illustrating the work table locking mechanism forming a detail of the invention.
Figure 7:
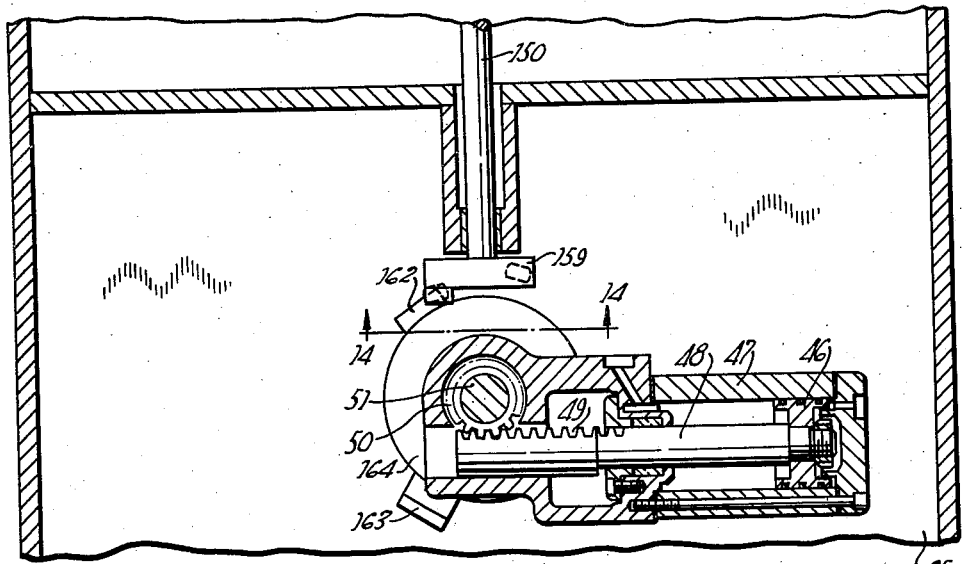
Figure 7 is a fragmentary horizontal sectional view as seen from line 7—7 on Figure 6.

In order to oscillate the work table use is made of a piston 46 enclosed within a suitable cylinder 47 secured to and carried by the plate 41. The piston 46 is secured to the inner end of a piston rod 48 which is provided near its other end with rack teeth 49. The rack teeth 49 mesh with a suitable rack pinion 50 integral with or secured to a vertically disposed shaft 51 rotatably journaled in a bracket 52, depending from the plate 41. The shaft 51 projects upwardly above the plate 41 to receive an arm 52' most clearly shown in Figure 4. The arm 52 has rotatably mounted thereon a roller 53 which has its axis eccentric to the axis of the shaft 51. The roller 53 is adapted to enter the space between a pair of lugs or blocks 54 and 55 secured to the under side of the table 43. From this it will be seen that oscillation of the arm 52' from the roller 53 and blocks 54 and 55 effects the oscillation of the table 43 from one operative position to the other. In order to clamp the table in its operative positions the plate 41, see Figure 6, is provided with a guideway 56 in which is disposed a clamping bar 57. The bar 57 is provided on its forward face with rack teeth 58 adapted to mesh with the teeth of a pinion 59 integral with or secured to the arm 52'. From this it will be seen that the bar 57 is axially shifted as the work table is oscillated. The ends of the bar 57 are adapted to enter the space between a clamping block or anvil and the opposed wall of the guide way 56 for thereby accurately positioning the work table and resisting any outward movement of the table due to the cut thrust on the work. Opposed to the clamping block or anvil 60 is a second block 61 likewise secured to the under side of the table 43. This block 61, see Figure 5, is substantially U-shaped in cross section to provide a lip 62. Substantially at the operative positions of the table 43 the plate 41 carries a stud 63 having a slot 64 formed therein to provide a lip 65. The lips 62 and 65 cooperate with one another to hold the table down against the supporting plate 41. It will be understood that there is a separate clamping mechanism at each end of the bar for correspondingly securing the table in position depending upon which of the broach rams 33 or 34 is operating through its cutting stroke.

Figure 20:
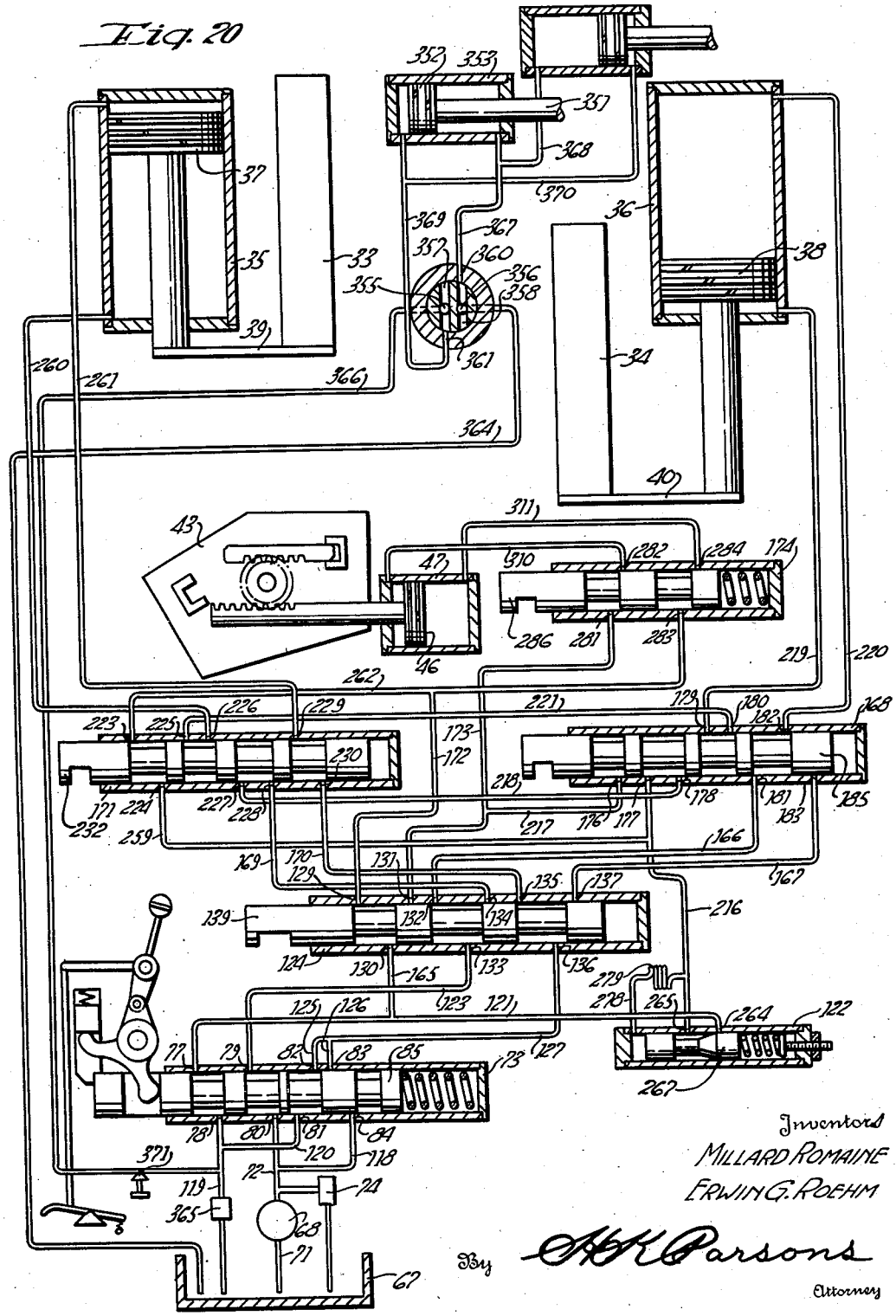
Figure 20 is a diagrammatic view illustrating the various hydraulic circuits involved in the invention.

The means for actuating the broach rams, pistons and the table indexing piston is clearly shown in Figure 20 in diagrammatic form. This hydraulic actuating and control mechanism will now be described with reference to Figure 20 and the several control valves and mechanisms for actuating them will be described as they are encountered while tracing the hydraulic circuit with reference to the structural view in which they are illustrated. Accordingly there is provided a sump or tank 67 containing the fluid to be circulated through the system, which is preferably oil, and the tank 67 is preferably located in the hollow base 25 of the machine. Located above the tank 67 is the pump 68 driven, see Figure 2, by the motor 69 which, together with the pump 70 68, is mounted on a plate 70 and disposed within the column through a suitable opening provided therethrough in the rear thereof. As seen in Figure 20 the pump 68 has connected to one side thereof a suction pipe 71 which terminates in the sump or tank 67. Projecting from the other side of the pump 68 is the pressure pipe or conduit 72 which terminates in a starting, stopping and emergency reverse valve indicated in general in Figure 20 by the reference numeral 73. The pressure pipe or conduit 72 is connected through a bypass and relief valve 74 with the tank 67 which mechanism, as is usual practice, determines the effective pressure in the pipe or conduit 72 and therefore the operating pressure for the system.

The valve mechanism 73 is structurally illustrated in Figure 11, and as there shown, comprises a valve block 75, which block incidentally is the only one in the machine and is secured in the column above the motor-pump compartment. The block 75 has pressed into it the starting, stopping and emergency reversing valve bushing 76 through which is formed a plurality of sets of radial ports 77, 78, 79, 80, 81, 82 and 83. Each of these sets of ports is encircled by a similar circumferential groove 84. Disposed within the bore in the bushing 76 is a valve member 85 provided with a plurality of piston portions and forming between them cannelures 86, 87, 88 and 89 adapted in different positions to connect the radial ports in different combinations.

In order to shift the valve member 85 it is provided with a valve stem 90 projecting into the casing 91 secured to the valve block 75. Within the casing 91 the valve stem 85 is provided with a notch 92 receiving therein the ball end 93 of an arm 94. The arm 94 is keyed or otherwise secured to a shaft 95 rotatably journaled in bearings provided by the left hand wall of the casing 91 and the said shaft projects beyond the left hand wall of the column 26, as seen in dotted lines in Figure 2. Secured to the projecting end of the shaft 95 is an arm 96 connected by a rod 97 to a lever 98 on the left hand side of the knee, see Figure 3. The lever 98 is secured to one end of a pivot rod 99 oscillatably journaled in the table support or knee 27 which rod projects beyond the right hand side of the knee to receive a second lever 100.

From the foregoing it will be seen that there is provided an operating lever on each side of the table support or knee 27 whereby the valve member 85 may be actuated to the position shown in Figures 11 and 12. It should be noted that this shifting of the valve is effected by actuating either the lever 98 or 100 in a clockwise direction, that is, toward the rear of the machine. Upon shifting of the valve member 85 to the position shown in Figure 11 a latch mechanism drops into place to hold the valve in this position. This mechanism comprises a notch 101 formed in the valve stem 90 and providing a shoulder 102 which abuts against a spring pressed plunger 103 yieldably actuated into operative position by a spring 104. Upon release by the plunger 103 the valve member 85 is shifted to its second or left hand position by a spring 105 disposed within a suitable counterbore formed in the end of the valve member, the spring abutting one end with the base of the counterbore and on the other end with a plug or cap 106 which closes the bore in the bushing.

In order to release the latch or plunger 103 it is provided thereon with a shoulder 107 riding on which is the end of a finger 108 projecting from the adjacent side of the arm 94. The arm 94 is actuated in a counterclockwise direction as seen in Figure 11 to cause the finger 108 to depress the plunger or latch against the spring 104. This movement of the arm 94 may be effected by either of the handles 98 or 100 or a supplementary emergency mechanism. It will be appreciated that it is only necessary to move either of the levers 98 or 100 forwardly or in a clockwise direction about the axis of the pivot shaft 99. The supplementary emergency stop mechanism comprises a kick bar 109 carried by the lower ends of arms 110 and 111, respectively disposed on the left and right hand sides of the machine as seen in Figure 1. The said levers are respectively pivoted to their respective sides of the machine by pivot pins 112 and 113. The arm 110 extends upwardly above its pivot 112 from which upper end is projecting a pin 114 adapted to be disposed in a cut-away portion 115 formed in the side of the connecting member or clevice 116 which connects the lever 98 with the valve actuating rod 97. The cut-away portion 114 provides at the end thereof a shoulder 117 against which the pin 114 engages.

As was mentioned above, the levers 98 and 100 are actuated rearwardly of the machine to position the valve as shown in Figures 11 and 20, in which position the valve is latched by the plunger 103. This movement of the lever 98 carries with it the member or clevis 116, which through the shoulder 117 and the pin 114 oscillates the arms 110 and 111 about the pivots 112 and 113, thereby throwing the kick bar 109 outwardly. Should an emergency arise with the operator standing on the base 25 it is only necessary for him to engage the bar 109 with his foot and force same rearwardly, thereby shifting the pin 114 of the arm 110 outwardly which through its engagement with the shoulder 117 correspondingly actuates the valve rod 97. This movement of the rod 97 actuates the arm 94 for releasing the latch 103 and permitting the movement of the valve member 85 by the spring 105.

Continuing with the description of the hydraulic circuit in Figure 20 it will be noted therefrom that the ports 80 of the bushing 76 have connected therewith the terminus of pressure pipe or conduit 72, while the ports 84 have connected therewith one end of pipe or conduit 118 which extends from the pressure pipe or conduit 72. The ports 78 and 81 have connected therewith respectively branch discharge conduits 119 and 120 which terminate in the sump or tank 67. The ports 77 have connected therewith one end of a pipe or conduit 121 which terminates at its other end in a pressure reducing or relief valve indicated generally in Figure 20 by the reference numeral 122. The ports 79 have connected therewith one end of a pipe or conduit 123 which terminates at its other end in the table actuating valve mechanism indicated generally in Figure 20 by the reference numeral 124. The remaining ports 82 and 83 have respectively connected therewith pipes or conduits 125 and 126 which empty into a pipe or conduit 127 terminating in the valve mechanism 124.

With the valve mechanism 73 in its starting or running position the pressure pipe or conduit 72 is connected with the pipe or conduit 123 and therefore the valve mechanism 124, which will now be described in detail with reference to Figure 10. As there shown, this valve mechanism includes a valve bushing 128 which is pressed into a suitable bore formed in the valve block 75. The bushing 128 is provided with a plurality of sets of radial ports 129, 130, 131, 132, 133, 134, 135, 136 and 137, each set of which is encircled by a similar circumferential groove 138. Disposed within the bore in the valve bushing is a valve member 139 provided with a plurality of piston portions forming therebetween reduced portions or cannelures 140, 141, and 142 which connect the ports in different combinations, depending upon the position of the valve member.

The valve member 139 has two operative positions, the one shown in Figures 9 and 20 and a second position to the left thereof. In order to shift the valve it has projecting therefrom a stem 140 which projects into the casing 91 and has formed therein a transverse notch 141. Received in the notch 141 is the ball end 142 of a valve actuator or arm 143 pivoted at 144 within the casing 91. The arm 143 is substantially L-shaped or in the form of a bell crank having the pivot 144 substantially at the apex thereof. The second arm 145 of the bell crank is pivoted at 146 to the upper end of the vertical slideable rod 147 which extends through a suitable bushing or bearing carried by the lower wall of the casing 91. The lower end of the rod 147, as seen in Figures 6 and 13, is pivotally connected at 148 to a plate 149 which is in turn secured to the end of a shaft 150 and oscillatably journaled in a bracket 151 secured to the rear face of the column plate 28 at a point below the valve block 75 and in line with the table actuating mechanism. To limit the amount of oscillation of the plate 149, and therefore the vertical movement of the rod 147 and consequently the position of valve member 139, the said plate 149 is provided with a pair of notches 152 and 153 between which is a lug 154, the sides of which are cam shaped and respectively terminate at the base of notches 152 and 153. Cooperating with the notches 152 and 153 and the intermediate lug 154 is a detent 155 having a nose 156. The detent 155 is pivotally mounted at 157 to the bracket 151. A spring 158 having one end connected to the detent 155 and the other anchored to the bracket 151 is utilized for maintaining contact between the detent nose 156 and the plate 149.

In order to oscillate the shaft 150 it projects through suitable bearings provided by the column and the table support or knee and projects into the interior of said table support or knee. Secured to the projecting end of the shaft 150 is a double ended arm 59 carrying at opposite ends bosses or projections 160 and 161. The depending bosses 160 and 161 are offset from one another and adapted to be respectively engaged by dogs 162 and 163 adjustably secured to the rim of a disc 164. The disc 164 is secured to the lower projecting end of the vertically disposed shaft 51 and is utilized for effecting the oscillations of the table.

From the foregoing it will be noted that as the work supporting table is oscillated the shaft 150 is likewise oscillated for effecting the movements of the parts which eventually shift the valve member 139. It should be noted that these parts are so arranged that the valve is shifted at the completion of the oscillation of the work table.

Referring again to Figure 20 it will be noted that the ports 133 and 136 of the bushing 128 have connected therewith the other terminals of pipes or conduits 123 and 127. While the ports 130 have connected therewith one terminus of pipe or conduit 165 which extends from the pipe or conduit 121, ports 132 and 137 have respectively connected therewith one end of pipe or conduit 166 and 167 which terminate at their other end in a valve mechanism indicated generally by the reference numeral 168 which is operated and controlled by the broach ram 34. Ports 134 and 135 have respectively connected therewith one end or terminus of pipes or conduits 169 and 170 which terminate at their other ends in a valve mechanism indicated generally in Figure 20 by the reference numeral 171 and under control and operation of the ram 33. The remaining ports 129 and 131 have respectively connected therewith one terminus of a pipe or conduit 172 and 173 which terminate at their other ends in a valve mechanism indicated in general in Figure 20 by the reference numeral 174 and adapted to be controlled and actuated by each of the rams 33 and 34 when said rams reach their uppermost position. Furthermore, and as will later be made clear, the valve mechanism 174 is a safety valve for use when the machine remains idle for any appreciable time.

Continuing with the hydraulic circuit it was noted that the hydraulic pressure from the pump 20 68 is connected through the valve mechanism 73 to the valve mechanism 124. With the parts in the position shown in Figure 20, the valve mechanism 124 connects the pressure in the pipe or conduit 123 with the pipe or conduit 166 and the valve mechanism 168. The valve mechanism 168 is shown structurally at the right hand end of Figure 8 and comprises a valve bushing 175 pressed into a suitable bore in the valve block 75. The bushing 175 has formed therethrough a plurality of sets of radial ports 176, 177, 178, 179, 180, 181, 182 and 183, each set being encircled by a similar circumferential groove 84 formed in the exterior of the bushing 175. Disposed within the bore in the bushing 175 is a valve member 185 having provided thereon a plurality of piston portions between which is formed reduced portions or cannelures 186, 187, 188 and 189 adapted to connect the sets of radial ports in different combinations, depending upon the position of the valve member.

The valve member 185 has two operative positions, the first shown in Figures 8 and 20 and a second position vertically of that shown in Figure 8 or to the right of that shown in Figure 20. In order to shift the valve member 185 it has projecting therefrom a valve stem 190 in which is formed a transverse notch 191 receiving the reduced or ball end 192 of a lever 193. The lever 193 is mounted for oscillation of a stud 194 carried by a lug 195, see Figure 9, projecting from the side of the casing 91. Integral with the lever 193 is a second lever 196 having its reduced or ball end 197 disposed in a slot 198 in valve shifter member 199, see Figure 9. The valve shifter member 199 is keyed or otherwise secured to an oscillatable rod 200 which projects outwardly through the forward wall of the casing 91 and through the forward portion of the column 26. Secured to the projecting portion of the rod 200 is a dog 201 having offset lugs 202 and 203, see Figure 1. The lugs 202 and 203 are adapted to be respectively engaged by dogs 204 and 205 located respectively at the lower and upper ends of the ram 34.

From the foregoing it will be noted that the rod 200 is reversely oscillated at each end of the ram stroke for correspondingly actuating the valve member 185. In order to accurately determine the position of the said valve member and to insure the complete shifting of the said valve member the valve shifter 199 is provided with a pair of notches 206 and 207 between which is the lug 208 having the sides thereof cam shaped and terminating at the notches 206 and 207. Contacting with the lug 208 and its sides is the nose 209 of a detent and load and fire dog 210 pivoted at 213 to a plug 214 let into the side of the casing 91. A spring pressed plunger 215 engages the lower face of the detent and fire dog 210 for yieldably holding same in contact with the lug. The operation of this mechanism is well understood and no further description thereof will be given at this time.

By reference to Figure 20 it will be noted that the ports 181 and 183 of the bushing 175 have respectively connected therewith the other ends of pipes or conduits 166 and 167. The ports 177 have connected therewith one end of a pipe or conduit 216 which terminates in the relief or pressure reducing valve mechanism 122, while the ports 176 and 178 have respectively connected therewith one end of pipes or conduits 217 and 218 respectively terminating at their other ends in the pipe or conduit 173 and the valve mechanism 171. The ports 179 and 182 have respectively connected therewith one end of pipe or conduit 219 and 220 respectively terminating at the lower and upper ends of the cylinder 36 which effects and controls the movement of the broach ram 34. The remaining ports 180 have connected therewith one end of a pipe or conduit 221 which terminates at its other end in the valve mechanism 171.

With the parts in the position shown in Figure 20 the hydraulic pressure in the pipe or conduit 166 is connected to the valve mechanism 168 with the pipe or conduit 220 and therefore the upper end of the cylinder 36. This causes a descent of the piston 38 for actuating the ram 34 through a cutting stroke. The medium on the other side of the piston 38 is exhausted through the pipe or conduit 219 to the valve mechanism 168 where it is connected with the pipe or conduit 221 and the valve mechanism 171.

The valve mechanism 171 is shown structurally at the left hand side of Figure 8 and is substantially a duplicate of the valve mechanism 168 as is the actuating mechanism therefor. Specifically, the valve mechanism 171 comprises a valve bushing 222 pressed into a suitable bore in the valve block 75. The valve bushing 222 has formed therethrough a plurality of sets of radial ports 223, 224, 225, 226, 227, 228, 229 and 230, each set being encircled by a similar circumferential groove 231 formed in the exterior of the bushing 222. Disposed in the bore in the bushing 222 is a valve member 232 provided with a plurality of piston portions forming between them reduced portions or cannelures 233, 234, 235 and 236 adapted to connect the radial ports in different combinations depending upon the position of the valve member 232.

In order to shift the valve member 232 it has projecting therefrom a valve stem 237 having formed therein a transverse slot 238 receiving the reduced or ball end 239 of a lever or arm 240. The arm or lever 240 is mounted for oscillation on a stud 241 carried by the lug 242 projecting from the side of the valve housing 91 as seen in Figure 9. The lever 240 has projecting therefrom a second arm 242 having a reduced or ball end 243 received in a slot 244 of a valve shifter member 245, the latter being clearly shown in Figure 9. The shifter member 245 is keyed or otherwise secured to the oscillatable rod 246 which projects through and beyond the forward wall of the casing 91 and the column 26. Secured to the projecting end of the rod 246, is a flipper dog 247 having offset lugs 248 and 249. The lugs 248 and 249 are adapted to be respectively engaged by dogs located at the lower and upper ends of the ram 33, the latter dog being shown in Figure 1 and indicated by the reference numeral 250. The dogs on the ram 33 are similar in all respects to the dogs 204 and 205 on the ram 34.

In order to insure the complete shifting and accurate positioning of the valve member 232 the shifter member 245 is provided with a pair of notches 251 and 252 between which is a lug 253 having the sides thereof cam shaped and terminating in the said notches. Engaging the cam faces of the lug 253 is a nose 254 of a load and fire dog and detent member 255 pivoted at 256 to a plug 257 secured in the side of the casing 91. To hold the nose 254 yieldably in contact with the lug 253 the member 255 is engaged by a spring pressed plunger 258 which is similar to the plunger 215. From the foregoing it is believed now evident how the valve member 232 is actuated and positioned relative to the bushing.

By reference to Figure 20 it will be noted that the ports 228 and 230 have respectively connected therewith the other ends of the pipes or conduits 169 and 170 extending from the valve mechanism 124, while the port 227 has connected therewith the other terminus of the pipe or conduit 218. The ports 224 have connected therewith one end of a pipe or conduit 259 which extends from the pipe or conduit 216. The ports 226 and 229 have respectively connected therewith one end or terminus of pipes 260 and 261 which respectively terminate at the lower and upper ends of the cylinder 35. The ports 225 have connected therewith the other terminus of the pipe or conduit 221, while the ports 223 have connected therewith one end of a pipe or conduit 262 which terminates at its other end in the pipe or conduit 172.

Continuing with the flow of the hydraulic pressure it will be seen that the valve mechanism 171 connects the exhaust pressure in the pipe or conduit 221 with the pipe or conduit 260 for delivering said exhaust medium to the underside of the piston 37 causing same to be raised or elevated and consequently the elevation of the ram 33. The medium on the other side of the piston 37 is exhausted through the pipe or conduit 261 to the valve mechanism 171 where it is connected with the pipe or conduit 170. The medium in the pipe or conduit 170 is connected through the valve mechanism 124 with the pipe or conduit 127 and its branch 128 with the valve mechanism 73. The valve mechanism 73 connects the medium with the sump or tank 67 by way of pipes or conduits 120 and 119.

From the foregoing it will be noted that the rams are being actuated in opposite directions simultaneously, one by the direct pressure and the other through the exhaust from the first. This movement of the rams continues until they have both reached their proper position, that is, the ram 34 in its lowermost position and the ram 33 in its uppermost position. At this time the valve member 185 of valve mechanism 168 is shifted to its right hand position, while the valve member 232 of valve mechanism 171 is shifted to its left hand position, both as shown in Figure 20. With the valves in their new or second position, the pressure in pipe or conduit 182 is connected with the pipe or conduit 221 and therefore with the valve mechanism 171. The valve mechanism 171 at this time connects the pressure in the pipe or conduit 221 with the pipe or conduit 259 and therefore both valve mechanisms 168 and 122 which, of course, is by way of pipe or conduit 216. The valve mechanism 122 is shown structurally in Figure 12 and will now be described in detail.

As shown in said Figure 12 the valve mechanism 122 comprises a valve bushing 263 pressed into a suitable bore formed in the valve block 75. The bushing 263 is provided with two sets of radial ports 264 and 265, each set being encircled by a groove 266 formed in the exterior of the bushing 263. Disposed within the bore in the bushing 263 is a valve member 267 having formed at opposite ends thereof piston portions 268 and 269. Extending from the latter piston portion is a reduced portion 270 terminating at the end of a conical portion 271 integral with and projecting from the piston portion 268. Contacting with the valve member 267 at one end thereof is a spring 272 which abuts on its other end with an adjustable abutment or screw 273. Contacting with the other end of the valve is a slideable plunger 274 having its free end disposed in a pressure chamber 275 formed in a plug 276, the plug 276 being provided with a port 277 therethrough.

As will be seen from Figure 20, the ports 265 have connected therewith the end of the pipe or conduit 216 while the ports 264 have connected therewith the pipe or conduit 121. The plug port 277 has connected therewith one end of a pipe or conduit 278 containing a chuck coil 279, the other end of which pipe 278 is connected with the pipe or conduit 216.

The pressure in the pipe or conduit 216 flows into the valve bushing 263 by way of the ports 265 and acts on the piston face from which the reduced portion 270 projects, which of course is a relatively small area compared to the cross sectional area of the piston portion 269. Simultaneously the pressure flows through the pipe or conduit 278 and choke coil 279 and acts on the full area of the piston 269 on the side opposite to that, which has the reduced portion 270 extending therefrom. Under these circumstances, the valve member 267 is shifted vertically, as seen in Figure 12, or to the right as seen in Figure 20 a distance depending upon the setting of the spring 272. This movement of the valve member 267 more or less opens the ports 264 for by-passing a certain quantity of fluid through the pipe or conduit 121, valve mechanism 73 and pipe or conduit 119 to the sump 67. This effects a pressure drop in the pipe or conduit 216.

With the valve member 185 of the valve mechanism 167 in its right hand position, the position to which it was shifted as described above, the reduced pressure in the pipe or conduit 216 is connected with the pipe or conduits 217 and 173 with the valve mechanism 174 since there can be no flow through the pipe or conduit 173 toward the valve mechanism 124 due to the position its valve member is occupying.

The valve mechanism 174 is shown structurally in the lower portion of Figure 10 and will now be described in detail. This valve mechanism comprises a valve bushing 280 pressed into a suitable bore formed in the valve block 75. The bushing 280 is provided therethrough with a plurality of sets of radial ports 281, 282, 283, and 284, each set being encircled by a similar circumferential groove 285 formed in the exterior of the bushing 280.

Disposed within the bore within the bushing 280 is a valve member 286 provided with a plurality of piston portions between which are formed reduced portions or cannelures 287 and 288 which are adapted to connect when in one position the ports 281 and 282 and the ports 283 and 284 while in a second position to disconnect said ports.

From the foregoing it will be noted that the valve member 286 has two operative positions, the one shown in Figures 10 and 20 and the second to the right of that shown. In order to shift the valve to its second or right hand position the valve member 286 has projecting therefrom a valve stem 289 in which is formed a transverse slot 290 receiving the reduced or ball end 291 of a lever mechanism 292. The lever mechanism 292 is oscillatably mounted on a stud 293 carried by the casing 91 and the said lever mechanism has projecting therefrom a second reduced portion or ball member 294 which is disposed at right angles to the ball end 291. The ball end 294 is received in a transverse slot 295 formed in the lower end of a vertically shifted rod 296 disposed for vertical movement in suitable bearings provided by the casing 91. The upper end of the rod 296, see Figure 9, is provided with a second transverse groove or slot 297 receiving the reduced ball end 298 of a lever 299. The lever 299 is keyed or otherwise secured to a rod 300 projecting outwardly through the casing 91 to and through the column 26. The projecting end of the rod 300 has secured thereto a flipper dog 301, see Figure 1. The dog 301 has on one end thereof a lug 302 adapted to be engaged by a dog 303 on the ram 34.

By reference to Figure 1 it will be noted that the ram dogs 303 and 204 are located one above the other for operating on flipper dogs 201 and 301 when the ram 34 is at the upper end of its movement. From this it will follow that when the ram 34 reaches its uppermost position it substantially simultaneously shifts the valve members 185 and 286. It should be noted, however, that the valve member must be shifted by each ram when it reaches its uppermost position and for this reason the dog 301 has projecting from it a reduced or ball portion 304 which is received in a transverse slot 305 formed in the adjacent end of a flipper dog 306 pivoted to the front of the column. The flipper dog 306 is provided with a lug 307 which corresponds to the lug 302 of the dog 301 and the said lug 307 is adapted to be engaged by a dog on the lower end of the ram 33, which is similar in all respects to the dog 204 on the ram 34. From which it will also follow that the valve members 232 and 286 are simultaneously shifted.

The valve member 286 is actuated in the other direction or to the position shown in the drawings, by means of a spring 308 which has one end abutting the end of the valve member 286 and its other end abutting a plug 309 which closes the bore through the bushing 280.

By reference to Figure 20 it will be noted that the ports 281 and 283 have respectively connected therewith the other ends of the pipes or conduits 173 and 172 which extend from the valve mechanism 124. The remaining ports 282 and 284 have respectively connected therewith one end of pipes or conduits 310 and 311 terminating at the forward and rear ends of the cylinder 47 for effecting the operation of the piston 46 therein.

Continuing with the flow through the hydraulic circuit and since the valve mechanism 174 and valve mechanisms 171 and 168 are substantially simultaneously shifted the pressure in the pipe or conduit 173 is connected with the pipe or conduit 310 for actuating the piston 46 in the cylinder 47 to the right and thereby indexing the table mechanism to present the work piece thereon to the action of the ram 33 while withdrawing the work piece from the ram 34. The exhaust on the other side of the piston 46 is at this time discharged through pipe or conduit 311, valve mechanism 174, pipe or conduit 172, valve mechanism 124, pipes or conduits 165 and 121 and pipe or conduit 119 to the sump or tank 67. As soon as the table is completely indexed and locked the valve member 139 of the valve mechanism 124 is shifted to its second or right hand position as shown in Figure 20. At this time the pressure in the pipe or conduit 123 is connected by the valve mechanism 124 with the pipe or conduit 169 and the valve mechanism 171. The said valve mechanism 171 is in its right hand position; pipe or conduit 169 is connected with the pipe or conduit 261 and the upper end of the cylinder 35 for actuating the piston 37 therein downwardly along with the ram 33 through a broaching or cutting stroke. The medium on the other side of the piston at this time is exhausted through the pipe or conduit 261 to the valve mechanism 171 where it is connected with the pipe or conduit 218 and the valve mechanism 168. With the valve mechanism 168 in its second or right hand position the said pipe or conduit 218 is connected with the pipe or conduit 219 and therefore the lower end of the cylinder 36 for actuating the piston 38 upwardly or through an idle stroke. The medium ahead of the piston 38 is being exhausted through the pipe or conduit 220 to the valve mechanism 168 where it is connected with the pipe or conduit 167 and the valve mechanism 124. The valve mechanism 124 at this time connects the pipe or conduit 167 with the pipe or conduit 127 and its branch 125 to the valve mechanism 73 which connects the branch 125 with pipes or conduits 120 and 119 to the sump or tank 67.

The broach rams continue to move until they reach the positions shown in Figure 1, whereupon the dog 250 on the ram 34 shifts the valve member of valve mechanism 171 to the position shown in Figure 20, while the dogs 204 and 302 on the ram 34 respectively shift the valve member of valve mechanism 168 to the position shown in Figure 20 and the valve member of valve mechanism 174 to its right hand position, that is, against the resistance of the spring 308.

At this time the pressure in the pipes 123, 169 and 218 is connected with the pipe or conduit 216 and the pressure reducing valve 122 to lower the pressure in said pipe or conduit 216 and therefore its branch 259. This reduced pressure in the pipe or conduit 259 is connected by the valve mechanism 171 with the pipe or conduit 262 and the valve mechanism 174 which connects the said reduced pressure with pipe or conduit 311 and the right hand side of piston 46 for shifting same to the left or to the position shown in Figure 20 and thereby indexing the table to the position shown in said Figure 20. The medium on the other side of the piston 46 is exhausted through the pipe 310 to the valve mechanism 174 and the pipe or conduit 173 to the valve mechanism 124 where it is connected with pipes or conduits 165 and 121, valve mechanism 73 and pipe or conduit 119 to the sump 67. As soon as the work table is fully indexed and clamped the valve mechanism 124 is shifted to the position shown in Figure 20, thereby placing the parts in a position for a repetition of the cycle just described.

From the foregoing it will be noted that the valve member 286 of the valve mechanism 174 is forcibly held in its second or right hand position, as seen in Figure 20, by the dog 302 on the ram 34 or its corresponding dog on the ram 33. From this it follows that as soon as the said dogs are free of the flipper dogs 301 and 306 the spring 308 will expand to shift the valve member 286 to the position shown in the drawings and thereby preventing any hydraulic medium or fluid from being introduced in the cylinder 47. One purpose for this mechanism is that should the machine remain idle for a considerable period of time, such as overnight, the ram in its upper position would probably fall by gravity and exhaust the medium ahead of it to the sump or tank. Should the machine then be started there is a possibility of effecting an indexing of the work table causing the work on the table to jamb against the broach tool and damage either the work, the tool or the machine itself, but with the valve mechanism 174 in the position shown this cannot occur until the parts are in a given definite position, that is, with the broach ram which is next to effect a cutting stroke in its upper or proper position which would automatically return the other broach ram to its lowermost position.

It should be noted at this time that the relief or pressure reducing valve mechanism 122 under certain circumstances prevents the falling of either ram 33 or 34. In the event that the ascending ram reaches the end of its stroke prior to the other or descending ram reaching its lowermost position the valve member of the valve mechanism 171 is shifted, thereby disconnecting the rams interconnecting conduits from one another and apparently relieving the back pressure on the descending ram. At this time, however, the exhaust conduit is connected with the pipe or conduit 216 to the pressure reducing valve mechanism 122. This valve, of course, opens as above described for by-passing the medium to the sump or tank, maintaining, however, a back pressure which prevents the descending ram from falling or traveling at an excessive rate. It will be appreciated of course that the rams are normally kept in phase and the movement of one ram independently of the movement of the other ram will take place only for a very short distance.

Due, infrequently it is true, to accidents and the like it is desired to reverse the rams without permitting them to complete their normal strokes and without indexing the work table which may have mounted thereon an unfinished work piece in addition to the piece of work which is being tooled. To effect this reversal of the rams use is made of the valve mechanism 73 by shifting the valve member 85 thereof to a third position. The starting or running position is shown in Figures 11 and 20 as above described, while the stopping position is that in which the valve member 85 takes a position to the left of that shown. This left hand position is determined by the left hand end 312 of the valve member 85 engaging the bushing or plug 313 held in operative position by a spring 314. The spring 314 is disposed in a counterbore in the plug 313 and abuts on its outer end with a screw plug 315 threaded into a carrier member 316 secured to the casing 81. It should be noted that the spring 314 is considerably stronger than the spring 305 which actuates the valve member 85 to its normal stop position. From this it follows that release of the valve member 85 by the latch 103 permits the spring 105 to shift the valve member only to its stop position.

In order to reverse the rams either of the handles 98 or 100 is engaged and pulled forward beyond the stop position, thereby shifting the valve member 85 against the resistance of the spring 84 and the lever is then held in this position. The shifting of the valve member 85 to its extreme left hand position connects the branch pressure conduit 118 through the valve mechanism 73 with the pipe or conduit 126 and the normal exhaust conduit 127 for reversing the flow through the system. This, then, makes the exhaust circuit a pressure circuit for thereby reversing the movement of the rams 33 and 34. In view of the fact that this is only utilized in an emergency the rams are actuated in a reverse direction but a short distance, whereupon on release of the pressure on either of the handles 98 or 100 the spring 314 returns the valve member 85 to its stopped position.

As will be seen from Figure 15 the work table 43 has mounted thereon a pair of work fixtures respectively indicated in general by the reference numerals 317 and 318, and since these fixtures are duplicates of one another only one of them will be described in detail. Accordingly, the fixture 318 comprises a plate 319 secured in any desirable manner to the oscillatable table 43. Mounted on the plate 319 is a slide 320 having secured to its outer end a plate 321. Secured to the plate for rotation relative thereto but not axial movement is a screw 322 having a tapered portion 323 projecting on one side of the plate and a threaded portion 324 projecting on the other side of the plate. The tapered portion 323 has clamped or otherwise secured thereto a knob 325 whereby the scew is rotated, the threaded portion 324 being threadedly received in a nut 326 bolted to the upper surface of the plate 319. This mechanism is utilized for obtaining minute adjustments toward and from the broach ram.

Secured to the forward end of the slide 320 is a work rest or block 327 on which is disposed the work piece 328 here shown as a connecting rod cap as used on internal combustion engines and the like. Above and behind the work 328 is an anvil 329 having projecting therefrom a pair of locating pins 330 and 331 which engage a rear part of the work piece and are utilized along with the anvil 329 for taking the lateral thrust during the cutting or tooling operation, while the work rest block 327 takes the vertical cut thrust.

The slide 320 is provided on each side of the anvil 329 with a pair of vertically disposed studs 332 and 333 to which are pivotally secured clamping arms 334 and 335. The arm 334 has adjustably secured to its one end a clamping jaw 336, while the arm 335 has likewise secured to one end thereof a clamping jaw 337. As will be seen in Figures 17 and 18 each of the jaws 336 and 337 are axially adjustable with respect to the arms by means of similar screws 338 and are subsequently secured in adjusted position by cap screws 339 passing through elongated apertures in the jaws and threaded into the arms 334 and 335. The other ends of the arms 334 and 335 are formed into semi-circular fingers or bosses 340 and 341 adapted to be engaged by an actuating mechanism for oscillating the said arms about their respective pivots 332 and 333.

The particular clamping arms actuating mechanism shown in the drawings comprises a cam member 342 having formed on opposite sides thereof inclined cam faces 343 and 344 adapted to respectively engage the ends 340 and 341 of the clamping arms. The cam member 342 is formed integral with a rotatable or oscillatable shaft 345 rotatably or oscillatably mounted in bearing bosses 346 and 347 integral with and upstanding from the slide 320. Any suitable or desirable means may be employed for rotating the shaft 345 and therefore the cam 342.

The particular means disclosed in the instant application comprises a rack gear 348 secured to a projecting end of the shaft 345 and disposed within a housing 349 secured to the side of the carriage 320. Meshing with the teeth of the rack gear 348 are the rack teeth 350 formed in a piston rod 351. The piston rod 351 is rotatably mounted in bearings provided by the bracket 349 and the said piston rod carries at its outer end a piston 352 enclosed within a cylinder 353 secured to the rear end of the slide 320. In order to hold the fingers 340 and 341 of the arms 334 and 335 against the cam faces 343 and 344 of the cam member 342 the said fingers are yieldably connected as by a spring 354 which at all times yieldably urges the said fingers toward one another.

The parts are so designed that the fluid for actuating the pistons is introduced into the cylinders during the oscillation of the work table whereby the finished work piece is unclamped and the unfinished one clamped without loss of any time. To effect this the pivot shaft or trunnion 42 is drilled to form a valve as shown clearly in Figures 6 and 19. As shown in Figure 6, the trunnion 42 is provided with a pair of vertical bores 355 and 356 extending substantially the full length thereof. The upper end of the shaft 42 is provided with cross bores 357 and 358 respectively intercepting the bores 355 and 356. Mounted on the upper end of the trunnion 42 is a cap 359 which is secured to the table for movement therewith. The cap 359 is provided with a pair of substantially oppositely disposed ports 360 and 361 which during the movement of the table 43 registered alternately with arcuate passages 362 and 363 formed at the opposite ends of the transverse bores 357 and 358.

By reference to Figure 20 it will be noted that the vertical passage 356 has connected therewith one end of a pipe or conduit 364, the other end of which is connected to the discharge pipe or conduit 119.

Disposed within the pipe or conduit 119 and on the other side of the connection of the pipe or conduit 364 therewith is a back pressure valve mechanism 365 for establishing a pressure in pipe or conduit 364. The other vertical port 355 in the trunnion 42 has connected therewith one end of a pipe or conduit 366 which terminates at its other end in the sump or tank 67. The port 360 in the cap 359 has connected therewith one end of a pipe or conduit 367 which terminates at one end of one of the work clamping cylinders 352 and through a branch pipe or conduit 368 with the opposite end of the second work clamping cylinder. The other port 361 in the cap has connected therewith one end of a pipe or conduit 369 terminating at the other end of the first work clamping cylinder and through a branch 370 with the first end of the second work clamping cylinder.

Disposed in the pressure pipe or conduit 366 is an adjustable throttle valve 371 which determines the rate at which the pistons of the work clamping mechanisms operate.

It should be noted that by reversing the ends of the cylinders to which the pipes or conduits 367 and 369 and their branches connect the said pistons are actuated in opposite directions for simultaneously securing one work piece in one fixture and releasing a second work piece in the second fixture.

From the foregoing it will be noted that there has been provided a broaching machine of the duplex type in which one ram is movable through its working stroke while the second ram is moving through its idle stroke, together with means for instantaneously stopping the rams in an emergency and for reversing said rams. The machine is further provided with automatic means for keeping the two rams in step with one another without the use of make-up valves or other auxiliary equipment. Additionally, the parts are so related and interlocked that the table cannot be indexed or actuated except when the rams are in a predetermined operative position. It will further be noted that the work is automatically positioned and clamped on the work table, thereby relieving the operator of this duty and materially reducing or eliminating fatigue on the operator.

What is claimed is:

1. In a broaching machine of the class described the combination of a bed, a pair of rams mounted on said bed for simultaneous reciprocation in opposite directions, an indexible table for presenting a work piece alternately to said rams, means operable by said rams for effecting the operation of the indexible table whereby said rams must each reach the ends of their strokes before the table is indexed, independent hydraulic motors for effecting the operation of the rams and the table, and means operable by the table when fully indexed for effecting the operation of the rams.

2. In a broaching machine of the class described the combination of a bed, a pair of rams mounted thereon for reciprocation in opposite directions through a cutting stroke and an idle stroke, an indexible table for presenting a work piece alternately to the rams while passing through their cutting strokes, and means operable during the indexing of the table for securing the work piece to the table which is to be presented to the ram passing through its cutting stroke.

3. In a broaching machine of the class described the combination of a bed, a pair of rams mounted thereon for reciprocation in opposite directions through a cutting stroke and an idle stroke, an indexible table for presenting a work piece alternately to the rams while passing through their cutting strokes, means operable during the indexing of the table for securing the work piece to the table which is to be presented to the ram passing through its cutting stroke, and simultaneously releasing the work piece just finished by the other ram.

4. In a broaching machine of the class described the combination of a bed, a first ram mounted on said bed for reciprocations relative thereto in opposite directions, a second ram mounted on said bed for reciprocations in opposite directions relative thereto, a hydraulic motor for each of said rams, a hydraulic circuit for the motors, means connecting said motors whereby the operation of one of them in one direction offsets the operation of the other in the opposite direction, an indexible table for presenting a work piece alternately to the ram moving through its cutting stroke, hydraulic means for actuating the indexible table, and a pair of valves, one for each of the rams and jointly operable to effect the operation of the table indexing means.

5. In a broaching machine of the class described the combination of a bed, a pair of broach rams, each carrying a broaching tool and operable respectively through a cutting and an idle stroke, an indexible table adapted to carry a pair of work pieces and operable alternately to present said work pieces to the broach rams while being actuated through their cutting strokes, a work fixture on the table for each work piece, and means operable during the indexing of the table for releasing the finished work piece from its fixture and securing the unfinished work piece in the other fixture.

6. In a broaching machine of the class described the combination of a bed, a pair of broach rams, each carrying a broaching tool and operable respectively through a cutting and an idle stroke, an indexible table adapted to carry a pair of work pieces and operable alternately to present said work pieces to the broach rams while being actuated through their cutting strokes, a work fixture on the table for each work piece, and means operable during the indexing of the table for releasing the finished work piece from its fixture and securing the unfinished work piece in the other fixture, including a hydraulically actuated motor for each work piece fixture.

7. In a machine tool organization having a bed, and a pair of tool rams mounted thereon and alternately operable through a cutting stroke, the combination of a work supporting mechanism comprising a pair of work fixtures for presenting a work piece to each of said rams when it is passing through its cutting stroke, and power actuated means for clamping and releasing each work piece relative to its fixture, including a hydraulic motor for each fixture, a pair of clamping arms, and a power actuated cam for actuating the clamping arms to their operative clamping positions.

8. In a machine tool organization having a bed, and a pair of tool rams mounted thereon and alternately operable through a cutting stroke, the combination of a work supporting mechanism comprising a pair of work fixtures for presenting a work piece to each of said rams when it is passing through its cutting stroke, power actuated means for clamping and releasing each work piece relative to its fixture, including a hydraulic motor for each fixture, a pair of clamping arms, and a power actuated cam for actuating the clamping arms to their operative clamping positions, and yielding means for releasing the arm.

9. In a machine tool organization having a bed, and a pair of tool rams mounted thereon and alternately operable through a cutting stroke, the combination of a work supporting mechanism comprising a pair of work fixtures for presenting a work piece to each of said rams when it is passing through its cutting stroke, and power actuated means for clamping and releasing each work piece relative to its fixture, including a work support on each fixture, a pair of clamping arms associated with each work support, a rotatable cam, a reciprocating hydraulic motor for rotating the cam and actuating the clamping arms to their clamping positions, and yielding means for releasing the arms.

10. In a machine tool organization having a bed, and a pair of tool rams mounted thereon and alternately operable through a cutting stroke, the combination of a work supporting mechanism comprising a pair of work fixtures for presenting a work piece to each of said rams when it is passing through its cutting stroke, power actuated means for clamping and releasing each work piece relative to its fixture, including a work support on each fixture, a pair of clamping arms associated with each work support, a rotatable cam, a reciprocating hydraulic motor for rotating the cam and actuating the clamping arms to their clamping positions, and yielding means for releasing the arms, and means for interconnecting the hydraulic motors whereby they are simultaneously actuated to simultaneously release a finished work piece in one fixture and secure a work piece in the other fixture.

11. In a machine tool organization of the class described the combination of a bed or column, a pair of broach rams mounted thereon for simultaneous reciprocation in opposite directions respectively through a cutting and an idle stroke, a hydraulic motor for each of said rams to effect its operation, means interconnecting said motors whereby the operation of one of them in one direction simultaneously actuates the other in the other direction, an indexible table adapted to support a pair of work pieces and operable for presenting alternately a work piece to each of said rams when moving through its cutting stroke, hydraulic motor for actuating the work support, and a pair of valves for controlling the operation of the indexible table, one operable by each of the rams upon reaching the end of its stroke, whereby each ram is in a definite position prior to the indexing of the table.

12. In a machine tool organization of the class described the combination of a bed or column, a pair of broach rams mounted thereon for simultaneous reciprocation in opposite directions respectively through a cutting and an idle stroke, a hydraulic motor for each of said rams to effect its operation, means interconnecting said motors whereby the operation of one of them in one direction simultaneously actuates the other in the other direction, an indexible table adapted to support a pair of work pieces and operable for presenting alternately a work piece to each of said rams when moving through its cutting stroke, hydraulic motor for actuating the work support, a pair of valves for controlling the operation of the indexible table, one operable by each of the rams upon reaching the end of its stroke, whereby each ram is in a definite position prior to the indexing of the table, and additional valve means normally preventing operation of the indexible table and operable by one of the rams when at one end of its stroke for permitting the operation of the indexible table upon actuation of the pair of valves by the rams.

13. In a machine tool organization of the class described the combination of a bed or column, a pair of broach rams mounted thereon for simultaneous reciprocation in opposite directions respectively through a cutting and an idle stroke, a hydraulic motor for each of said rams to effect its operation, means interconnecting said motors whereby the operation of one of them in one direction simultaneously actuates the other in the other direction, an indexible table adapted to support a pair of work pieces and operable for presenting alternately a work piece to each of said rams when moving through its cutting stroke, hydraulic motor for actuating the work support, a pair of valves for controlling the operation of the indexible table, one operable by each of the rams upon reaching the end of its stroke, whereby each ram is in a definite position prior to the indexing of the table, additional valve means normally preventing operation of the indexible table and operable by one of the rams when at one end of its stroke for permitting the operation of the indexible table upon actuation of the pair of valves by the rams, and yielding means for returning the additional valve means to its normal position upon actuation of the ram from its valve operating position.

14. A broaching machine including a pair of oppositely reciprocating broaching tools and a table having a pair of operative positions for selectively presenting individual work pieces to one or the other of the broaching tools during its operative stroke, working holding fixtures including hydraulically operated clamping means carried by the table and individual to each work position, a first hydraulic circuit for effecting an oscillation of the table to determine the presentation of a work piece to a broach, broach operable means for controlling said table oscillating circuit, a supplemental hydraulic circuit operatively associated with the work clamping devices, and table operated means for determining the effective coupling and disconnection of the supplemental circuit with the clamping devices whereby a work piece will be automatically clamped in position during presentation thereof to a broach during its operative stroke.

15. In a machine tool organization of the class described the combination of a bed or column, a pair of broach rams mounted thereon for simultaneous reciprocation in opposite directions respectively through a cutting and an idle stroke, an hydraulic motor for each of said rams to effect its operation, means interconnecting said motors whereby the operation of one of them in one direction simultaneously actuates the other in the other direction, an indexible table adapted to support a pair of work pieces and operable for presenting alternately a work piece to each of said rams when moving through its cutting stroke, hydraulic motor for actuating the work support, a pair of valves for controlling the operation of the indexible table, one operable by each of the rams upon reaching the end of its stroke whereby each ram is in a definite position prior to the indexing of the table, hydraulic clamp means for securing the work pieces in position on the table, and valve means operable upon indexing of the table for determining the clamping and releasing of the work pieces.

16. A broaching machine of the character described, including a bed, a pair of broach actuating rams carried by the bed, independent power means for simultaneously shifting the rams in opposite directions, an indexible table having separate work receiving portions, means for indexing the table selectively to present one of said work receiving portions to a broach ram during its operative stroke, and an hydraulic circuit for determining the indexing movement of the table, said circuit including a plurality of serially arranged valves, and means operable by individual broach rams for automatically positioning different of said serially arranged valves whereby the joint reaction of the several rams on the valves of the series will determine the ultimate hydraulic actuation of the work receiving table.

MILLARD ROMAINE.
ERWIN G. ROEHM.